(12) United States Patent  
Cleary et al.

(10) Patent No.: US 11,603,896 B2  
(45) Date of Patent: Mar. 14, 2023

(54) GUIDE ASSEMBLY FOR A DISC BRAKE

(71) Applicant: Meritor Heavy Vehicle Braking Systems (UK) Limited, Gwent (GB)

(72) Inventors: Sean Cleary, Gwent (GB); Alex Szafnauer, Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 0 days.

(21) Appl. No.: 17/479,247

(22) Filed: Sep. 20, 2021

(65) Prior Publication Data

US 2022/0136577 A1     May 5, 2022

(30) Foreign Application Priority Data

Oct. 30, 2020 (EP) ..................................... 20205003

(51) Int. Cl.
| | |
|---|---|
| *F16D 66/02* | (2006.01) |
| *F16D 65/00* | (2006.01) |
| *F16C 17/02* | (2006.01) |
| *F16D 55/00* | (2006.01) |
| *F16D 66/00* | (2006.01) |

(52) U.S. Cl.
CPC .......... *F16D 65/0087* (2013.01); *F16C 17/02* (2013.01); *F16D 66/021* (2013.01); *F16D 2055/007* (2013.01); *F16D 2066/006* (2013.01); *F16D 2250/0084* (2013.01)

(58) Field of Classification Search
CPC ............... F16D 65/0087; F16D 66/021; F16D 2055/007; F16D 2066/006; F16D 2250/0084; F16C 17/02
See application file for complete search history.

(56) References Cited

U.S. PATENT DOCUMENTS

| | | | | |
|---|---|---|---|---|
| 3,102,759 | A | * | 9/1963 | Stewart .................... B61F 15/02 384/624 |
| 4,109,766 | A | | 8/1978 | Inoue et al. |
| 4,747,472 | A | | 5/1988 | Rath et al. |
| 5,087,907 | A | * | 2/1992 | Weiler ................... F16D 66/026 200/61.4 |
| 5,701,119 | A | * | 12/1997 | Jurras, III ............. F16C 17/246 340/682 |
| 8,770,351 | B2 | * | 7/2014 | Engels ................... B60T 17/228 303/112 |
| 9,618,067 | B2 | * | 4/2017 | Philpott ................... F16D 65/38 |
| 10,066,662 | B2 | * | 9/2018 | Kuhlmann ............. G01B 7/144 |
| 10,544,700 | B2 | * | 1/2020 | Reigl ........................ F01D 5/02 |
| 10,801,566 | B2 | * | 10/2020 | Taylor ............... F16D 55/22655 |
| 11,313,423 | B2 | * | 4/2022 | Taylor .................. F16D 66/025 |
| 2005/0158511 | A1 | * | 7/2005 | Sabol ...................... F23R 3/007 428/131 |

(Continued)

OTHER PUBLICATIONS

Extended European Search Report dated Feb. 2, 2021 for related European Appln. No. 20205003.5; 4 Pages.

*Primary Examiner* — Thomas W Irvin (74) *Attorney, Agent, or Firm* — Brooks Kushman PC (57) ABSTRACT

A caliper guide assembly and a method of manufacture. The guide assembly may include a guide pin, a guide bore arranged to receive the guide pin and permit relative axial sliding thereof, a bush arranged to define at least part of the guide bore, and a sensor arrangement configured to provide an output indicative of a state of wear of the bush.

21 Claims, 6 Drawing Sheets

(56) References Cited

U.S. PATENT DOCUMENTS

| | | | |
|---|---|---|---|
| 2009/0223083 A1* | 9/2009 | LeCrone | F26B 13/14 |
| | | | 384/129 |
| 2012/0211312 A1* | 8/2012 | Engels | F16D 55/2245 |
| | | | 188/72.4 |
| 2013/0199879 A1 | 8/2013 | Thompson | |
| 2017/0122366 A1* | 5/2017 | Kuhlmann | G01N 3/56 |
| 2018/0283221 A1* | 10/2018 | Reigl | F01K 13/003 |
| 2019/0162256 A1* | 5/2019 | Taylor | F16D 66/025 |
| 2021/0025464 A1* | 1/2021 | Taylor | F16D 55/227 |
| 2021/0270334 A1* | 9/2021 | Taylor | B60T 1/065 |

* cited by examiner

GUIDE ASSEMBLY FOR A DISC BRAKE

TECHNICAL FIELD

The present invention relates to a caliper guide assembly for a heavy vehicle disc brake, a bush for a caliper guide assembly for a heavy vehicle disc brake, and to a method of manufacturing a bush for a caliper guide assembly for a heavy vehicle disc brake.

BACKGROUND

Disc brakes are commonly used for braking heavy vehicles such as trucks, buses, and coaches. Heavy vehicle disc brakes typically include a brake carrier, a brake caliper, and a brake rotor. The brake carrier is arranged to carry brake pads on each side of the brake rotor. The brake caliper is mounted on the brake carrier and slidably supported by at least one guide assembly such that, when the disc brake is actuated, the brake caliper is able to slide with respect to the brake carrier. As the brake caliper slides inboard, the brake pads are urged onto the opposing faces of the rotor in a clamping action and a braking action is achieved.

The guide assembly has a guide pin slidably arranged in a guide bore. The guide pin can be secured to the brake carrier and slidably arranged in a guide bore disposed in the brake caliper so that the brake caliper can slide along the guide pin relative to the brake carrier.

Typically, the guide bore is defined by a bush disposed within a recess or through hole defined by the brake caliper. In use, the bush will wear due to movement of the guide pin in relation to the guide bore and vibration of the disc brake. The bush is replaceable, and is intended to be replaced regularly, e.g., upon service of the disc brake. However, it may be that a bush becomes worn beyond service guidelines between service or inspection intervals. Such an overly worn bush may lead to unwanted rattling noise on movement between the guide pin and the guide bore. In addition, an overly worn bush may fail to prevent contact between the guide pin and the brake caliper, potentially leading to damage of the guide pin, as well as uneven brake pad wear or binding or seizing of the brake caliper. An overly worn bush can also lead to unwanted contact between the brake caliper and other components of the disc brake, potentially causing damage of those components.

The present teachings seek to overcome or at least mitigate the problems of the prior art.

SUMMARY

A first aspect of the present teachings provides a caliper guide assembly for a heavy vehicle disc brake, the guide assembly comprising a guide pin; a guide bore arranged to receive the guide pin and permit relative axial sliding thereof; a bush arranged to define at least part of the guide bore; and a sensor arrangement configured to provide an output indicative of a state of wear of the bush.

The sensor arrangement detects wear of the bush and provides an indication of the current state of wear of the bush. An indication is therefore provided of whether a bush requires replacement, i.e., whether the state of wear of the bush is such that noise irritation may be caused, or damage may be caused to the disc brake components if the bush is not replaced, without the need for a time-consuming visual inspection of the bush.

In exemplary embodiments, the bush has a predetermined state of wear, and the sensor arrangement is configured to indicate whether the bush has reached said predetermined state of wear.

Configuring the sensor arrangement to provide an indication of a predetermined state of wear simplifies reading of the output of the sensor arrangement. An operator can quickly and simply see from the sensor output whether the bush has yet reached the predetermined state of wear, so that the condition of the bush can easily be assessed without the need to perform a visual or physical inspection.

In exemplary embodiments, said predetermined state of wear is a replacement state of wear at which the bush should be replaced.

A clear indication is provided that the bush is in one of two states, i.e., either to be replaced, or not yet requiring replacement, so that no further consideration on the part of the operator is required in order to determine whether a bush requires replacement.

In exemplary embodiments, the bush comprises a wall arranged to define at least part of the guide bore, and the sensor arrangement is configured to detect wear at at least two locations of the wall.

In exemplary embodiments, the sensor arrangement is configured to detect wear at at least two circumferential locations of the wall.

In exemplary embodiments, the sensor arrangement is configured to detect wear at at least two axial locations of the wall.

In exemplary embodiments, the sensor arrangement is configured to detect wear about the full circumference of the bush.

In exemplary embodiments, the sensor arrangement is configured to detect wear along the full length of the bush.

The primary area of wear depends upon the orientation of the disc brake. As the sensor arrangement can be used to detect wear at circumferentially different points around the bush, the greatest extent of wear of the bush can be detected at different orientations of installation of the disc brake.

In exemplary embodiments, the sensor arrangement comprises at least one sensor component, and the sensor or each sensor component is incorporated within the wall.

Incorporation of the sensor component within the wall allows the bush to be used with standard sized brake components, i.e., no adaptation of e.g., the caliper bore is required. The sensor component can extend through any location of the wall without affecting the overall size and shape of the bush, allowing wear to be detected at different locations of the wall.

In exemplary embodiments, the sensor arrangement comprises a sensor component, wherein the sensor component forms part of an electrical circuit, and the sensor arrangement is configured to provide an output indicative of a state of wear of the bush upon variation of the electrical circuit.

In exemplary embodiments, the wall comprises at least an inner layer and an outer layer, and the sensor or each sensor component is incorporated within the inner layer.

In exemplary embodiments, the inner layer comprises a plastics material.

The inner layer of plastics material can be applied as a coating about the or each sensor component, improving ease of manufacture.

There is also provided a bush for a caliper guide assembly for a heavy vehicle disc brake, the bush defining at least part of a guide bore for receiving a guide pin and permitting relative axial sliding thereof, the bush comprising a sensor arrangement configured to provide an output indicative of a state of wear of the bush.

In exemplary embodiments, the bush has a predetermined state of wear, and the sensor arrangement is configured to indicate whether the bush has reached said predetermined state of wear.

In exemplary embodiments, said predetermined state of wear is a replacement state of wear at which the bush should be replaced.

Configuring the sensor arrangement to provide an indication of a predetermined state of wear simplifies reading of the output of the sensor arrangement. An operator can quickly and simply see from the sensor output whether the bush has yet reached the predetermined state of wear, so that the condition of the bush can easily be assessed without the need to dismantle the disc brake.

When the predetermined state of wear is a replacement state of wear, a clear indication is provided that the bush is in one of two states, i.e., either to be replaced, or not yet requiring replacement, so that no further consideration on the part of the operator is required in order to determine whether a bush requires replacement.

In exemplary embodiments, the bush further comprises a wall arranged to define at least part of the guide bore, wherein the sensor arrangement is configured to detect wear at at least two locations of the wall.

In exemplary embodiments, the sensor arrangement is configured to detect wear at at least two circumferential locations of the wall.

In exemplary embodiments, the sensor arrangement is configured to detect wear at at least two axial locations of the wall.

The location of the bush where most wear takes place, or primary wear location, typically depends upon the orientation of the disc brake. As the sensor arrangement can be used to detect wear at circumferentially distinct points around the bush, primary wear of the bush can be detected regardless of the orientation of the disc brake.

In exemplary embodiments, the sensor arrangement is configured to detect wear about the full circumference of the bush.

In exemplary embodiments, the sensor arrangement is configured to detect wear along the full length of the bush.

In exemplary embodiments, the sensor arrangement comprises at least one sensor component, and the sensor or each sensor component is incorporated within the wall.

Incorporation of the or each sensor component within the wall allows the bush to be used with standard sized brake components, i.e., no adaptation of e.g., the caliper bore is required.

This location allows the sensor arrangement to detect wear at circumferentially distinct locations of the bush, such that primary wear of the bush can be detected regardless of the orientation of the disc brake.

In exemplary embodiments, the sensor arrangement comprises a sensor component, wherein the sensor component forms part of an electrical circuit, and wherein the sensor arrangement is configured to provide an output indicative of a state of wear of the bush upon variation of the electrical circuit.

In exemplary embodiments, the wall comprises at least an inner layer and an outer layer, and the sensor or each sensor component is incorporated within the inner layer.

In exemplary embodiments, the inner layer comprises a plastics material.

The inner layer of plastics material can be applied as a coating about the or each sensor component, improving ease of manufacture.

There is further provided a method of manufacturing a bush for a caliper guide assembly for a heavy vehicle disc brake, the bush defining at least part of a guide bore for receiving a guide pin and permitting relative axial sliding thereof, the method comprising the steps of: providing a sensor arrangement configured to provide an output indicative of a state of wear of the bush, wherein the sensor arrangement comprises at least one sensor component; and incorporating the or each sensor component within a coating of the bush.

Incorporation of the sensor component within a coating of the bush provides an effective method of fitting the sensor to bush. Advantageously, the bush can be of a standard size and so can be used as a replacement for a bush without a sensor.

BRIEF DESCRIPTION OF THE DRAWINGS

Embodiments will now be described, by way of example only, with reference to the accompanying figures, in which:

FIG. 3b is an isometric view of the bush of FIG. 3a;

FIG. 4b is an isometric view of the bush of FIG. 4a;

FIG. 5b is an isometric view of the bush of FIG. 5a;

FIG. 6b is an isometric view of the bush of FIG. 6a.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
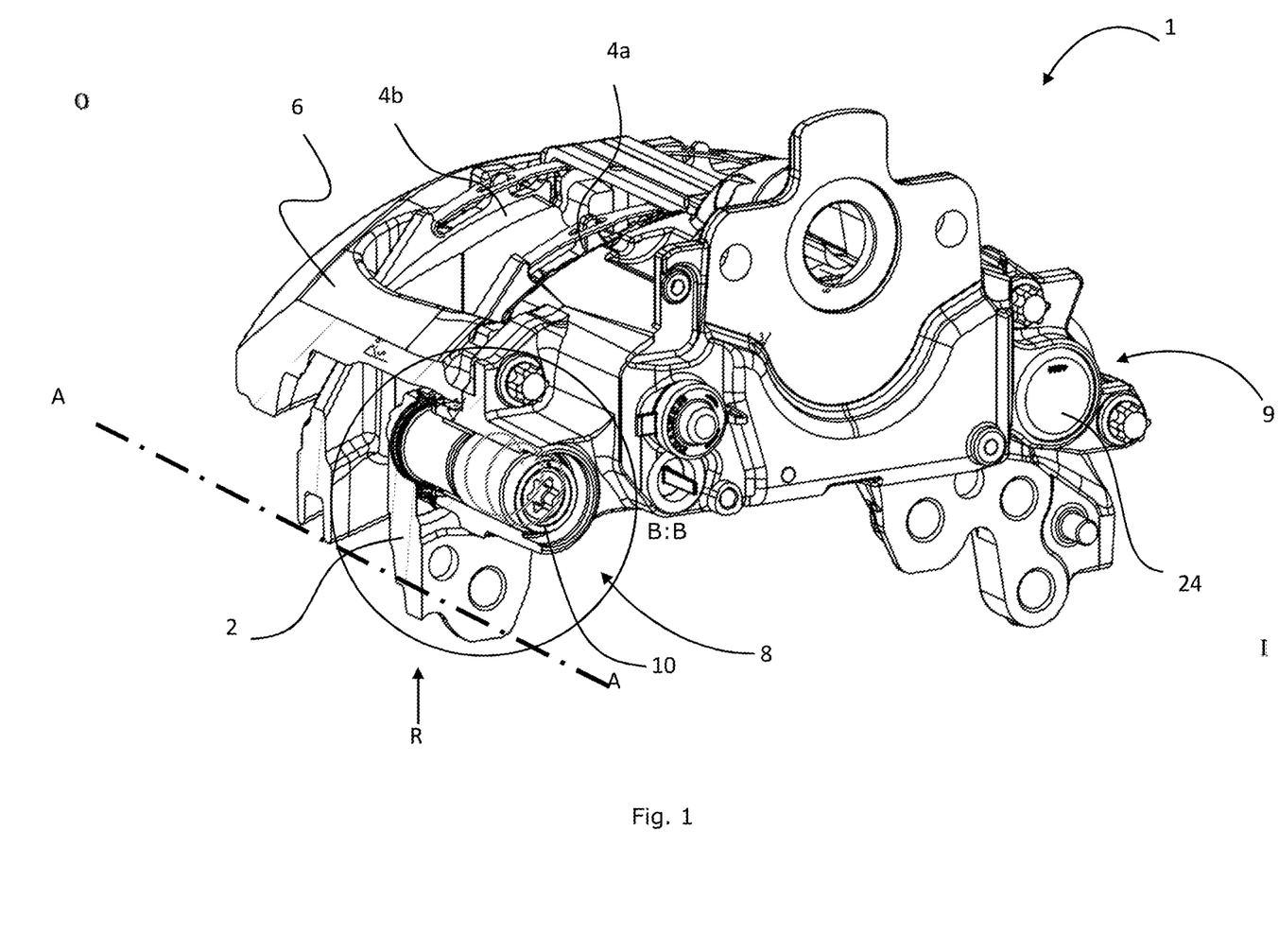
FIG. 1 is an isometric view, partially cut away to improve clarity, of a disc brake according to the present teachings.

With reference to FIG. 1, a disc brake of the present teachings is indicated generally at 1. Various orientations of the disc brake are described. In particular the directions inboard I and outboard O refer to the typical orientation of the disc brake when fitted to a vehicle and with reference to the longitudinal centerline of the vehicle. The radial direction R refers to an orientation with reference to the center of a brake rotor (axis A-A) and is for example the direction in which brake pads may be fitted to and removed from a disc brake.

The disc brake 1 has a brake carrier 2. The brake carrier 2 carries an inboard brake pad 4a and an outboard brake pad 4b. A brake rotor (not shown) is positioned between the brake pads and is rotatable about the axis A-A. A brake caliper 6 is slidably mounted on the brake carrier 2.

The disc brake 1 has at least one guide assembly. In the depicted embodiment the disc brake 1 has first and second guide assemblies 8, 9. The guide assemblies 8, 9 slidably support the brake caliper 6 and allow the brake caliper 6 to slide in an inboard-outboard direction relative to the brake carrier 2.

Figure 2:
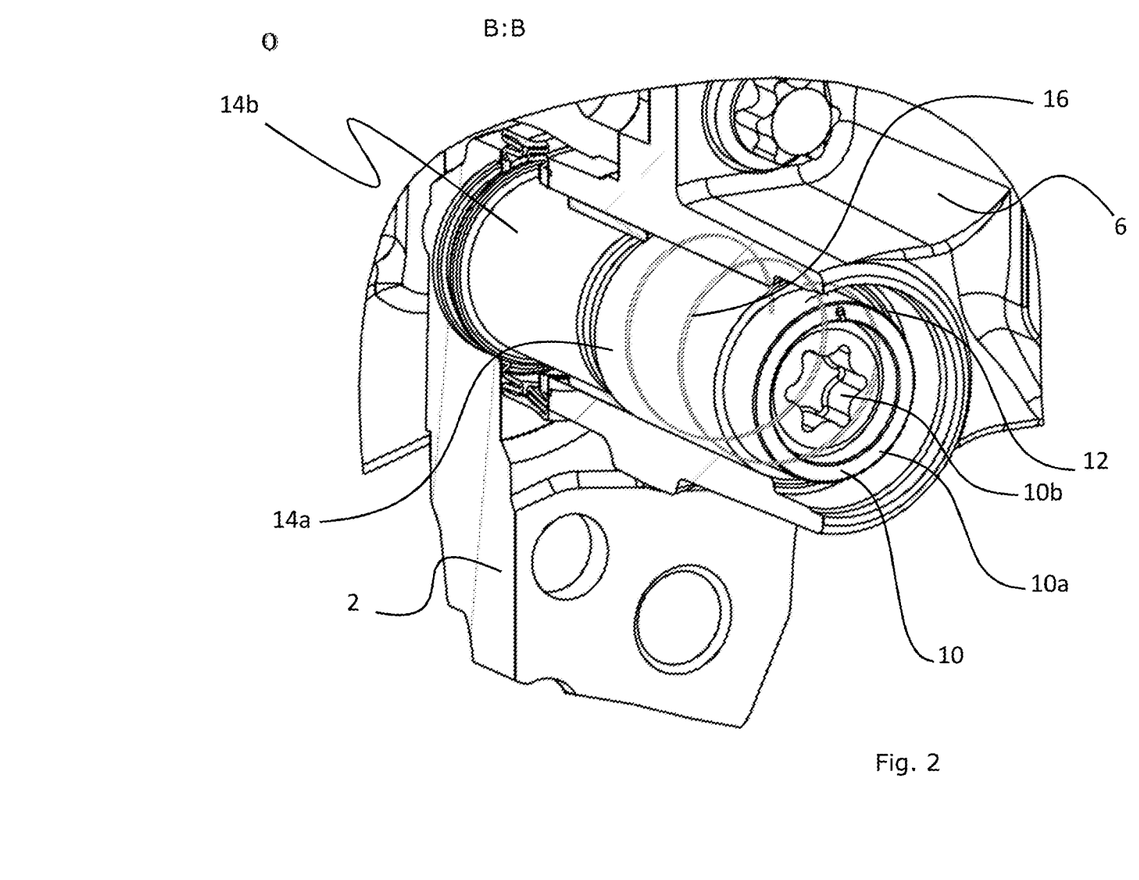
FIG. 2 is an enlarged sectional view B:B of a guide assembly of the disc brake of FIG. 1.

As shown in FIGS. 1 and 2, the first guide assembly 8 has a guide pin 10 and a guide bore 12. In this embodiment, the guide pin 10 is secured to the brake carrier 2. In this embodiment, the guide bore is disposed in the brake caliper 6. The guide bore 12 is arranged to receive the guide pin 10 and permit relative axial sliding thereof, so that the brake caliper 6 is slidably supported in relation to the brake carrier 2.

In this embodiment, the guide pin 10 has a guide sleeve 10a secured to the caliper by a fastener 10b. In other embodiments, some other type of guide pin is used, e.g., a monolithic guide pin, or a guide sleeve attached to the carrier by some other means, e.g., welding.

Each guide assembly 8, 9 has a guide pin of a different length. The first guide assembly 8 has a longer guide pin 10 than that of the second guide assembly 9. The fit between the guide pin 10 and the guide bore 12 of the first guide assembly 8 is tighter than that of the guide pin and guide bore of the second guide assembly 9. The greater extent of wear of a guide bush therefore takes place at the first guide assembly 8.

The first guide assembly 8 has at least one bush 14 arranged to define at least part of the guide bore 12. The guide assembly includes a sensor arrangement 16 configured to provide an output indicative of a state of wear of the bush 14.

In providing an indication of the state of wear of the bush 14, the sensor arrangement advantageously gives an indication of whether the bush 14 should be replaced. That is, an operator such as a driver or mechanic is given an indication of the state of wear of the bush 14, for example in the cab of a vehicle, and can reach a decision on whether or not the bush 14 should be replaced in order to avoid excess wear or damage to other components of the disc brake 1 without needing to carry out a visual inspection of the bush 14. The time taken to carry out such a visual or physical inspection is thus advantageously saved, and the likelihood of a worn bush causing unwanted noise or damage to other components of the disc brake 1 is reduced.

In addition, the life of the bush may be extended. Without the sensor arrangement 16, a slightly worn bush may be replaced as a precaution during a brake service despite not reaching the service guideline level of wear, in order to avoid the service guideline or replacement level of wear between servicing of the disc brake. The guideline replacement level of wear may vary from model to model of disc brake, but is defined for each type of disc brake, for example in the service manual for that disc brake. Wear of the bush is measured using a dial gauge mounted on the disc brake to detect the amount of movement possible between brake components and the vehicle, e.g., between the brake caliper and the wheel hub. Typically, in a disc brake of the type shown in FIG. 1, a bush requires replacement when 2 to 3 mm of movement between the brake caliper and the wheel hub is possible. This is likely to occur when the greatest extent of bush wear is in the region of 1 mm, or between 0.5 mm and 1 mm.

With the sensor arrangement 16 providing an indication of wear between inspections of the brake, a slightly worn bush can be left in place, and the full life or a greater extent of the life of the bush 14 can be expended, so saving costs.

The bush 14 has a pre-determined state of wear, i.e., a particular level of wear at which it has been determined that an indication of said level of wear would be of use to an operator. The sensor arrangement 16 is configured to provide an output indicative of whether the bush 14 has reached the pre-determined state of wear. Reading of the sensor arrangement output is thereby simplified, as the operator will be given a straightforward indication of whether or not the pre-determined state of wear has been reached, i.e., a yes/no indication.

In this embodiment, the pre-determined state of wear is a replacement state of wear. That is, the pre-determined state of wear is the level of wear at which the bush 14 should be replaced in order to avoid damage to the other components of the disc brake 1. Advantageously, a clear indication is thereby provided to the operator of whether or not the bush 14 should be replaced, without the need for further consideration nor consultation of a "safe" level of wear of the bush 14. In an alternative embodiment, the pre-determined state of wear is such that an indication is given that the bush is likely to require a replacement in the near future, e.g., after a particular number of further driven miles.

The predetermined state of wear of the bush 14 can be customized for a particular bush, e.g., depending on the bush construction and material(s), and/or the type of disc brake in which the bush 14 is disposed. Life of the disc brake 1 can thus be increased.

Figure 3A:
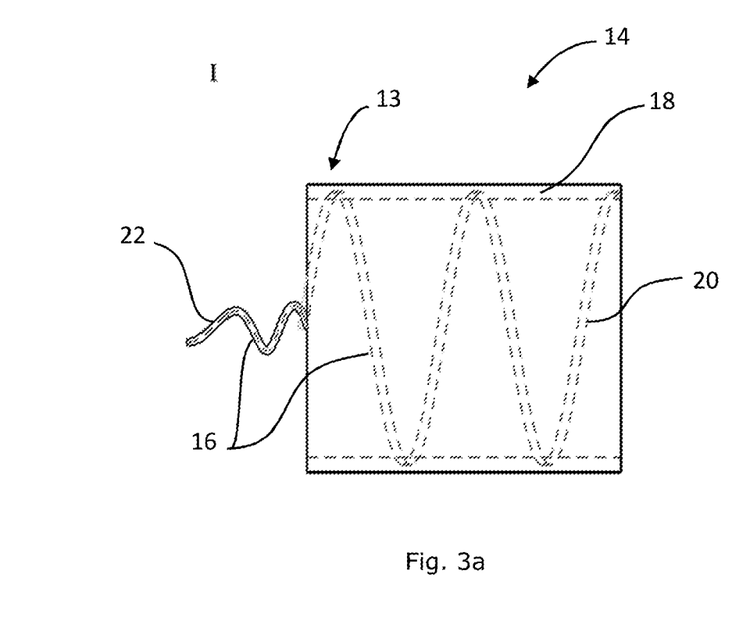
FIG. 3a is a side view of a bush of the guide assembly of FIG. 2.
Figure 3B:
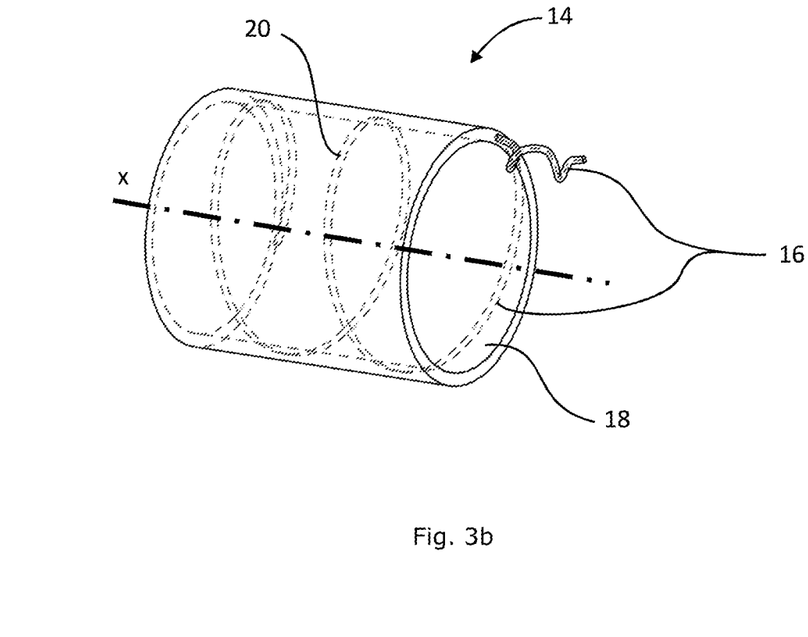
Figure 4A:
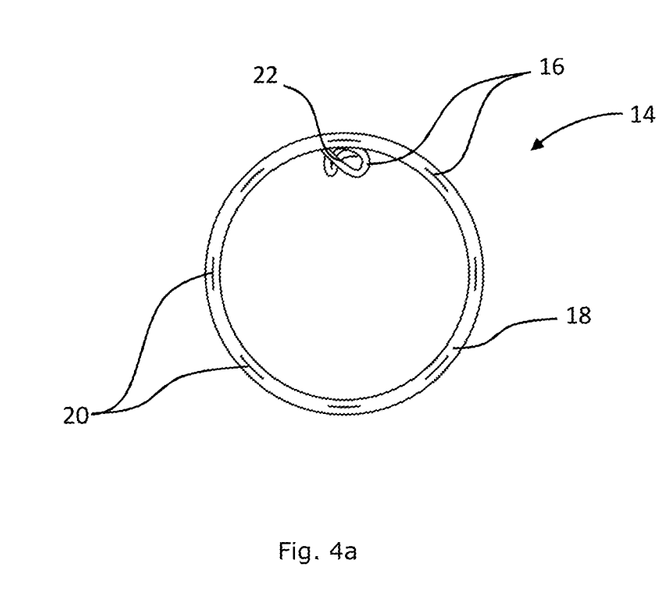
FIG. 4a is an end view of an alternative bush for a guide assembly of a disc brake.
Figure 4B:
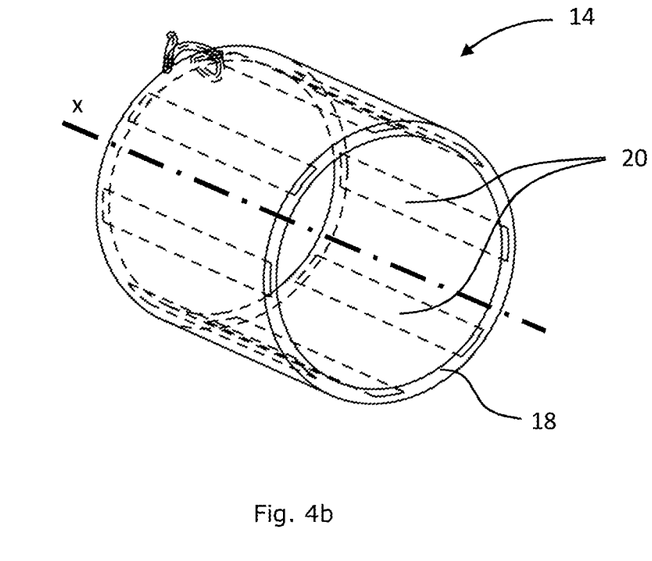

The bush 14 is shown in further details in FIGS. 3a and 3b. The bush 14 has a wall 18. The wall 18 defines at least part of the guide bore 12. In this embodiment, the guide bore 12 is substantially circular in cross section. In this embodiment, the wall 18 is cylindrical, i.e., in the form of a cylindrical tube. In alternative embodiments, the outer perimeter of the bush is of some alternative cross section, i.e., non-circular. In alternative embodiments, the guide bore is non-circular in cross section, e.g., oval, obround, elliptical, hexagonal, or irregularly polygonal.

The sensor arrangement 16 is arranged to detect wear of the wall 18. Typically, wear of the bush 14 takes place primarily in one area, due to the repetitive action of the disc brake 1. Wear tends to occur when the disc brake is not applied, as the guide pin and the guide bore are able to move in relation to one another. In this embodiment, where the guide pin 10 and the guide bore 12 are substantially cylindrical, wear occurs on the wall 18 of the bush 14 in a line contact, referred to here as the primary area of wear.

The sensor arrangement 16 being configured to detect wear of the wall 18 provides an indication of a state of wear at the primary area of wear, so that the indication of the state of wear of the bush 14 is based on the most advanced level of wear of the bush 14. The disc brake components are in this way protected from the damage that could be caused by a bush 14 worn beyond the guideline level of wear.

The sensor arrangement 16 detects wear at more than one location of the wall 18. In this embodiment, the sensor arrangement 16 detects wear about the full circumference of the wall 18. In alternative embodiments, the sensor arrangement detects wear at multiple distinct locations about the circumference of the wall, i.e., at multiple locations in a direction orthogonal to a longitudinal axis X of the bush 14. Wear detection can therefore advantageously take place at the primary area of wear regardless of the orientation at which the disc brake 1 has been installed on a vehicle.

In an alternative embodiment, the bush has a location means configured to orientate the bush about the longitudinal axis X in relation to the brake caliper, and so in relation to the disc brake. For example, the bush may be keyed to the brake caliper bore or recess in which the bush is fitted. In such an embodiment, wear detection can be provided in the predicted primary area of wear.

In this embodiment, as shown in FIGS. 3a and 3b, the sensor arrangement 16 has a sensor component 20. The sensor component 20 extends within the wall 18 and is in the form of an insulated wire 20 that is part of an electrical circuit. When the guide pin 10 wears through the wall 18 and comes into contact with the wire 20, the wire 20 is displaced and/or worn, such that there is a variation in the resistance of the electrical circuit. The sensor arrangement 16 provides an indication that this variation in resistance has taken place, so as to indicate that wear of the bush 14 has reached a particular level.

The wire 20 can be damaged by wear to different extents, and the sensor arrangement 16 provides an output to indicate the extent of wear. In this embodiment, as the insulation of the wire 20 is first worn and the wire 20 itself is affected, resistance of the circuit is varied by a particular predetermined amount, or by an amount within a particular predetermined range. Upon detecting this change in resistance, the sensor arrangement 16 provides a first signal, e.g., an intermittent signal, e.g., an intermittent audio or visual warning to an operator in the vehicle cab or on diagnostic equipment used during maintenance of the disc brake, that a particular predetermined amount of wear of the bush 14 has occurred. As the bush 14 and so the wire 20 continue to be worn, the wire 20 will become damaged, or further damaged, or will break, and further change to the resistance of the electrical circuit will take place. The sensor arrangement 16 provides a second signal, e.g., a continuous audio or visual warning, that a further particular amount of wear of the bush 14 has occurred, e.g., a replacement level of wear. Should the wire 20 come into uninsulated contact (i.e., where the insulation of the wire has been damaged through wear) with a metallic part of the bush 14 (see below), resistance of the electrical circuit is again altered, and a further indication is provided by the sensor arrangement 16.

In alternative embodiments, an indication is provided only at a replacement level of wear of the bush. In alternative embodiments, an indication is provided at further states of wear of the bush.

The sensor component 20 extends fully around the circumference of the wall 18, such that the orientation of the disc brake 1 and the location of the primary area of wear will not affect detection of the greatest extent of wear. In addition, the bush 14 can be fitted to the first guide assembly 8 in any orientation yet will continue to provide an indication of the greatest extent of wear of the bush 14.

As shown in FIGS. 1-3b, in this embodiment, the sensor component 20 extends through the wall 18 in a spiral configuration. Advantageously, the sensor component 20 extends the full length of the bush 14. Wear detection is thereby provided along the full length of the bush 14, as well as about the full circumference. The pitch of the spiral, i.e., the distance between each turn of the spiral, and the number of times the spiral extends about the wall, can be varied.

The sensor component 20 is incorporated within the wall 18. Incorporation of the sensor component 20 within the wall 18 allows the sensor component 20 to extend around the circumference of the wall 18 without affecting the overall size and shape of the bush 14. The bush 14 can therefore advantageously be used to replace a standard sized bush in a guide assembly without the need for adaptation of, for example, the bore disposed in the caliper in which the bush 14 is fitted.

The sensor arrangement 16 has a sensor cable 22 extending from an end of the bush 14 in order to connect the sensor arrangement 16 to the vehicle to which the disc brake 1 is fitted. A suitable connector (not shown) for connecting the sensor arrangement 16 to wiring of a control system of the vehicle is provided. In this embodiment, the sensor cable 22 extends from an inboard end 13 of the bush 14 so that the sensor cable 22 is positioned as far as possible from the rotor, and so from the heat generated at the rotor. A cap such as the cap 24 shown on the second guide assembly 9 in FIG. 1 is provided in this embodiment. In such an embodiment, the sensor cable 22 extends through the cap.

As shown in FIG. 1, the guide assembly 8 has an inboard bush 14a and an outboard bush 14b. In such an arrangement, the greatest extent of wear typically takes place at the outer end of each bush, i.e., at the inboard end of the inboard bush 14a and the outboard end of the outboard bush 14b. Typically, wear is greatest at the outer end of the outboard bush 14b.

Alternative configurations of the sensor arrangement 16 are shown in FIGS. 4a-5b. The bush 14 of FIGS. 4a and 4b has a sensor arrangement 16 with a series of sensor components 20 arranged about the circumference of the wall 18 and extending parallel to the longitudinal axis X of the bush 14. As in the bush shown in FIGS. 3a and 3b, such a sensor arrangement provides detection along the length of the bush 14, as well as at locations about the circumference of the wall 18.

Figure 5A:
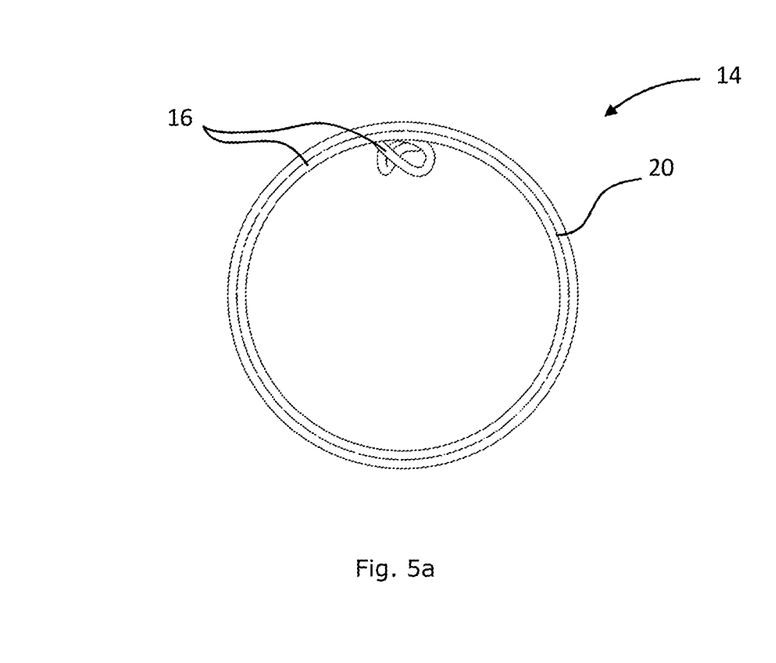
FIG. 5a is an end view of a further alternative bush for a guide assembly of a disc brake.
Figure 5B:
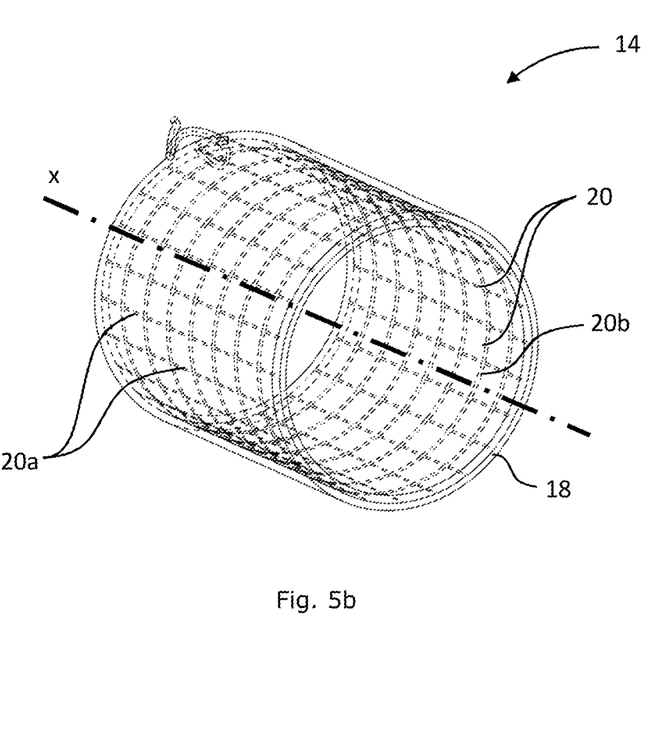

The bush 14 of FIGS. 5a and 5b has a sensor component 20 in the form of a lattice arranged about the circumference of the wall 18. The sensor component 20 has parallel strips 20a extending parallel to the longitudinal axis X of the bush 14, intersected by orthogonal strips 20b extending parallel to one another around the circumference of the wall 18. Advantageously, such an arrangement can provide an indication of wear along the length of the bush 14, and around the full circumference of the bush 14. The spacing between the strips 20a, 20b, and so the number of strips 20a, 20b, can be varied.

Figure 6A:
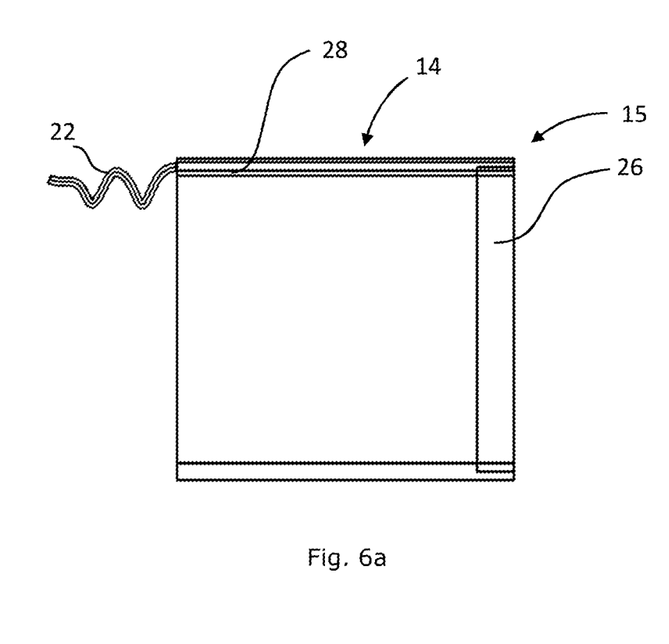
FIG. 6a is a side view of a further alternative bush for a guide assembly of a disc brake.
Figure 6B:
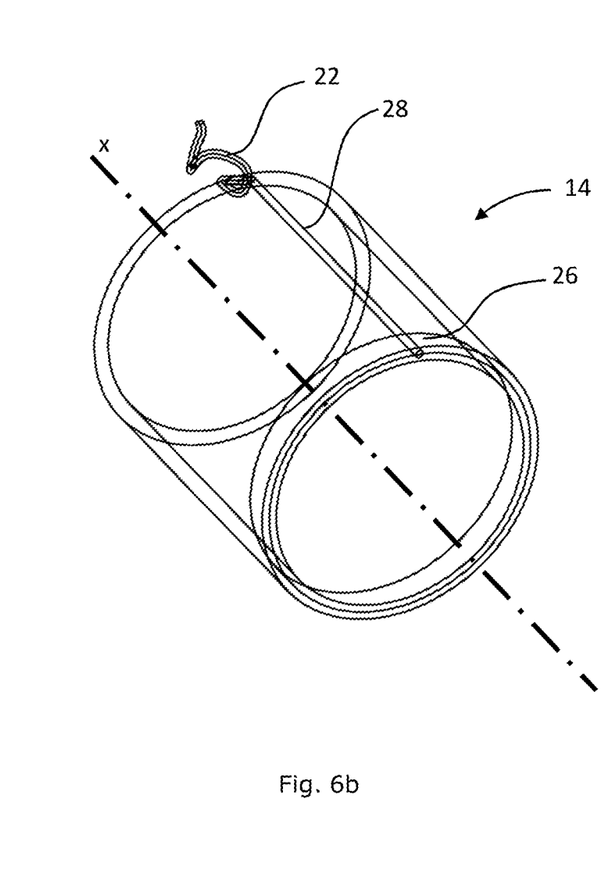

In one embodiment, shown in FIGS. 6a and 6b, the sensor component 20 extends about the full circumference of the bush 14 at a substantially constant axial location 26, i.e., at a constant axial distance from an end of the bush, to form a closed loop about the wall. In this embodiment, such a loop is positioned proximal the outboard end 15 of the bush 14. For example, the sensor component 20 is positioned at the outboard end of the bush 14, or within 5 mm of the outboard end of the bush 14, or within 10 mm of the outboard end of the bush 14. When the bush 14 of this embodiment is an outboard bush 14b, the sensor arrangement 16 can thus detect the greatest extent of wear of the bush 14b and so the greatest extent of wear of both bushes 14a, 14b. In order for the sensor cable 22 to extend from the inboard end of the bush 14 without interrupting the guide sleeve 10a or the brake caliper 6, the sensor cable 22 extends through the wall 18 via a route indicated at 28. In alternative embodiments, the sensor cable extends through the wall via a suitable alternative route or leaves the bush at the outboard end thereof.

In alternative embodiments, alternative configurations of the sensor component or components are used. In one embodiment, the sensor arrangement has a series of zigzag sensor components extending axially along the bush. In one embodiment, the sensor arrangement has a series of sensor components in wave lines extending axially along the bush. In such embodiments, the peaks and troughs of the sensor components can be arranged to align or overlap to extend over the full circumference of the bush, and so provide full circumferential wear detection.

In one embodiment, the sensor arrangement has a sensor component fitted to a secondary bush. The secondary bush is similar to the bush 14 described above and is to be used in conjunction with the primary or main bush or bushes of a guide assembly in order to provide an indication of wear, although the secondary bush defines at least part of the guide bore and will provide some support to the guide pin. As the main function of the secondary bush is to provide wear detection rather than to support the guide pin, the secondary bush is axially shorter than the primary bush or bushes.

The secondary bush is worn in the same way as the primary bush or bushes, so that detection of wear of the secondary bush provides an indication of the extent of wear of the primary bush or bushes. In this embodiment, the secondary bush has an inner diameter substantially coincident with the replacement level of wear of the primary bush or bushes, so that the secondary bush becomes worn and provides an indicative output as the replacement level of wear of the primary bush or bushes is reached.

The secondary bush is in one embodiment arranged at the outboard end of the guide assembly, i.e., outboard of an outboard bush. The secondary bush is adjacent the outboard end of the outboard bush, e.g., in contact with the outboard end of the outboard bush. In an alternative embodiment, the secondary bush is arranged elsewhere within the guide assembly, e.g., at the inboard end of an inboard bush. In one embodiment, the sensor component of the secondary bush is incorporated in the wall of the secondary bush in a closed loop.

In this embodiment, the sensor component 20 is embedded within the wall 18 at a depth such that contact between the sensor component 20 and the guide pin 10 occurs when the greatest extent of wear reaches the point at which the bush 14 should be replaced. In an alternative embodiment, the sensor component is embedded within the wall at a depth where, when the greatest extent of wear is such that the guide pin comes into contact with the sensor component, a certain amount of predicted useable life remains in the bush, so that an indication is provided that it should be replaced in a pre-set number of driven miles.

In the embodiments shown in FIGS. 3a-5b, the sensor component or components 20 are incorporated within the wall 18 at a substantially uniform depth. That is, each of the sensor component or components 20 are at the same radial distance from the longitudinal axis X of the bush.

In this embodiment, the bush 14 is of multiple layers. In this embodiment, the bush is of an outer layer, a middle layer, and an inner layer.

The guide bore 12 is defined by the inner layer. In this embodiment, the inner layer is a coating of a plastics material such as PTFE. The middle layer is a metallic layer of e.g., bronze. The sensor component 20 is located between the inner layer and the middle layer, so that the inner layer incorporates the sensor component 20, i.e., so that the inner layer secures the sensor component in place. The outer layer is a further metallic layer of e.g., steel.

In this embodiment, the materials of each layer are layered with one another whilst flat, i.e., prior to being shaped into a bush. The sensor component 20 is positioned between the inner layer and the middle layer, and the layers are compressed in order to secure the layers to one another. Adhesive may be used between one or more layers. The joined layers are then shaped to form the bush 14. The sensor component 20 is held in place between the inner and middle layers by the inner layer.

In an alternative embodiment, the bush is of an injection molded material, or has an injection molded layer. In such an embodiment, the sensor component is integral to the injection molded material.

In order to have indication of when the guide bushes of a disc brake require replacement, an indication of the greatest extent of wear of any of the guide bushes can be given using a guide bush 14 with a sensor arrangement 16 on the first guide assembly 8 only, as the greatest extent of wear takes place at the first guide assembly 8 (as described above).

The first guide assembly 8 of this embodiment has two bushes 14 as described herein. In an alternative embodiment, the first guide assembly has one bush with a sensor arrangement as described herein, and a further standard bush without a sensor arrangement. In such an embodiment, a state of wear of the standard bush is estimated based on the indicated state of wear of the bush 14.

The second guide assembly 9 of this embodiment includes a single bush arranged to define at least part of the guide bore. In this embodiment, second guide assembly 9 has a standard bush without a sensor arrangement. In an alternative embodiment, the second guide assembly has a bush 14 with a sensor arrangement as described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A caliper guide assembly for a heavy vehicle disc brake, the caliper guide assembly comprising:
    a guide pin;
    a guide bore arranged to receive the guide pin and permit relative axial sliding thereof;
    a bush arranged to define at least part of the guide bore; and
    a sensor arrangement configured to provide an output indicative of a state of wear of the bush.

2. The caliper guide assembly of claim 1 wherein the bush has a predetermined state of wear, and wherein the sensor arrangement is configured to indicate whether the bush has reached the predetermined state of wear.

3. The caliper guide assembly of claim 2 wherein the predetermined state of wear is a replacement state of wear at which the bush should be replaced.

4. The caliper guide assembly of claim 1 wherein the bush comprises a wall arranged to define at least part of the guide bore, and wherein the sensor arrangement is configured to detect wear at at least two locations of the wall.

5. The caliper guide assembly of claim 4 wherein the sensor arrangement is configured to detect wear at at least two circumferential locations of the wall, and/or wherein the sensor arrangement is configured to detect wear at at least two axial locations of the wall.

6. The caliper guide assembly of claim 4 wherein the sensor arrangement is configured to detect wear about a full circumference of the bush, and/or wherein the sensor arrangement is configured to detect wear along a full length of the bush.

7. The caliper guide assembly of claim 4 wherein the sensor arrangement comprises at least one sensor component, and wherein the at least one sensor component is incorporated within the wall.

8. The caliper guide assembly of claim 7 wherein the wall comprises at least an inner layer and an outer layer, and wherein the at least one sensor component is incorporated within the inner layer.

9. The caliper guide assembly of claim 8 wherein the inner layer comprises a plastic material.

10. The caliper guide assembly of claim 1 wherein the sensor arrangement comprises a sensor component, wherein the sensor component forms part of an electrical circuit, and wherein the sensor arrangement is configured to provide the output upon variation of the electrical circuit.

11. A bush for a caliper guide assembly for a heavy vehicle disc brake, the bush defining at least part of a guide bore for receiving a guide pin and permitting relative axial sliding thereof, the bush comprising:
   a sensor arrangement configured to provide an output indicative of a state of wear of the bush, wherein the sensor arrangement is configured to detect wear along a full length of the bush.

12. The bush of claim 11 wherein the bush has a predetermined state of wear, and wherein the sensor arrangement is configured to indicate whether the bush has reached the predetermined state of wear.

13. The bush of claim 12 wherein the predetermined state of wear is a replacement state of wear at which the bush should be replaced.

14. The bush of claim 11 further comprising a wall arranged to define at least part of the guide bore, wherein the sensor arrangement is configured to detect wear at at least two locations of the wall.

15. The bush of claim 14 wherein the sensor arrangement is configured to detect wear at at least two circumferential locations of the wall, and/or wherein the sensor arrangement is configured to detect wear at at least two axial locations of the wall.

16. The bush of claim 14 wherein the sensor arrangement comprises at least one sensor component, and wherein the at least one sensor component is incorporated within the wall.

17. The bush of claim 14 wherein the wall comprises at least an inner layer and an outer layer, and wherein at least one sensor component is incorporated within the inner layer.

18. The bush of claim 17 wherein the inner layer comprises a plastic material.

19. The bush of claim 11 wherein the sensor arrangement comprises a sensor component, wherein the sensor component forms part of an electrical circuit, and wherein the sensor arrangement is configured to provide the output upon variation of the electrical circuit.

20. A method of manufacturing a bush for a caliper guide assembly for a heavy vehicle disc brake, the bush defining at least part of a guide bore for receiving a guide pin and permitting relative axial sliding thereof, the method comprising the steps of:
   providing a sensor arrangement configured to provide an output indicative of a state of wear of the bush, wherein the sensor arrangement comprises at least one sensor component, wherein the sensor arrangement is configured to detect wear along a full length of the bush; and
   incorporating the at least one sensor component within a coating of the bush.

21. A bush for a caliper guide assembly for a heavy vehicle disc brake, the bush defining at least part of a guide bore for receiving a guide pin and permitting relative axial sliding thereof, the bush comprising:
   a sensor arrangement configured to provide an output indicative of a state of wear of the bush; wherein the sensor arrangement is configured to detect wear about a full circumference of the bush.

* * * * *